United States Patent [19]

Marsh

[11] Patent Number: 4,624,495
[45] Date of Patent: Nov. 25, 1986

[54] TANK AND VALVE COVER WITH TRANSPORTING ASSEMBLY

[76] Inventor: Gary L. Marsh, 3501 Bernard St., 1-A, Bakersfield, Calif. 93306

[21] Appl. No.: 732,068

[22] Filed: May 9, 1985

[51] Int. Cl.4 .................... B65D 87/06; B65D 61/00
[52] U.S. Cl. .................................. 294/31.2; 294/165; 294/169
[58] Field of Search ............ 294/31.2, 27.1, 30, 294/32, 137, 146, 148, 149, 151, 153, 154, 155, 156, 157, 165, 169, 170; 206/446, 317, 407, 417, 413; 248/242 R, 313, 89, 79; 16/110 R, 114 R

[56] References Cited

U.S. PATENT DOCUMENTS

| | | | |
|---|---|---|---|
| 2,434,655 | 1/1948 | Homer | 294/169 |
| 3,240,407 | 3/1966 | Book | 294/31.2 |
| 3,817,435 | 6/1974 | DeLuca et al. | 294/31.2 |
| 3,921,872 | 11/1975 | Buell, Jr. | 294/31.2 |
| 4,345,789 | 8/1982 | Garnett | 294/31.2 |
| 4,424,999 | 1/1984 | Commins | 294/165 |
| 4,463,978 | 8/1984 | Mountain et al. | 294/31.2 |
| 4,486,044 | 12/1984 | Gordon et al. | 294/31.2 |
| 4,556,245 | 12/1985 | Gruenwald | 294/31.2 |

Primary Examiner—James B. Marbert
Attorney, Agent, or Firm—Kenneth J. Hovet

[57] ABSTRACT

A hollow cylindrical-shaped cover member having a rounded end for enclosing the valve end of a tank containing compressed gases. The interior end portion is cut-away to house the valve assembly. The interior surface is ribbed and the sidewall is slotted to allow contraction thereof for frictional engagement with the tank. A locking device is used for contracting the sidewall and the cover member includes a handle and tote means for carrying the tank. A portable boot with wheels for engagement with the tank bottom is also provided.

21 Claims, 10 Drawing Figures

TANK AND VALVE COVER WITH TRANSPORTING ASSEMBLY

BACKGROUND OF THE INVENTION

1. Field of the Invention

The present invention relates to protective handling means for heavy compressed gas tanks.

More particularly, the invention relates to a cover and handling assembly for portable compressed gas tanks and the valve assemblies therefore.

2. Description of the Prior Art

It is well known that tanks containing gases under high pressure are heavy and very cumbersome to handle. Unfortunately, the various valve devices, pressure regulators, gages and fittings therefore are somewhat fragile. Further, such mechanisms are precariously mounted atop the tanks and are thereby exposed to all manner of harm. Man-handling of multiple tanks without some type of protective means begs for accidental breakage of the valve assemblages with the concommitant danger created by escaping compressed gas.

To facilitate handling of the heavy tanks, various types of carrying devices have been developed as shown in U.S. Pat. Nos. 2,434,655; 3,817,435; 4,345,789 and 4,463,978. These devices basically involve the use of split bands that encircle the tank for clamping engagement therewith. A handle is attached to the bands so the tank may be lifted and carried.

While greatly easing the carrying of tanks, such prior art devices are wholly void of providing any protection to the valve assemblies. The valves are still exposed and can be readily knocked from their mounts as before. Also, the devices offer no protection for the tank cylinder itself nor do they provide ground transport means.

SUMMARY OF INVENTION

The present invention provides a versatile and highly effective cover and transport assembly for portable compressed gas-filled tanks. A hollow cylindrical member having a closed parabolic-shaped end is used to enclose the tank valve assembly. It may also cover at least a portion of the tank. Ribs extending longitudinally along the inner surface of the cover allow for any necessary venting.

One or more straps encircle the cover having ends that are drawn toward each other. The ends are connected by locking means. Such means operate over a slot formed in the cover sidewall to allow for contraction of the cover diameter and frictional engagement with the tank. The cover includes leg members and a handle with accessory tote means. An optional boot with wheels can be attached to the tank bottom.

DESCRIPTION OF THE PREFERRED EMBODIMENTS

Figure 1:
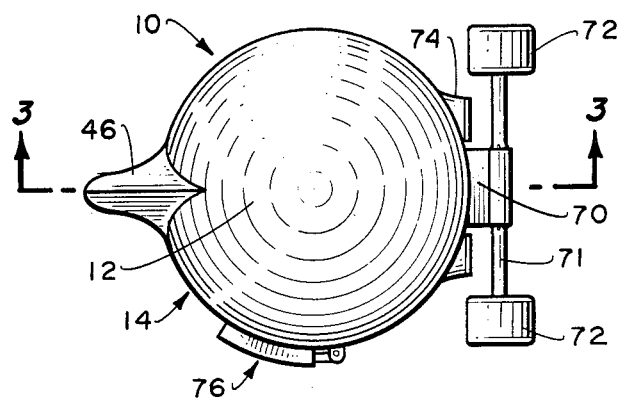
FIG. 1 is a top plan view of the cover and transport assembly of the present invention.

With reference now to the drawings, the cover of the invention is shown generally by reference numeral 10. The cover is adapted to fit over a compressed gas tank shown by reference numeral 16. Such tanks are typically elongated cylinders having a rounded upper-shoulder portion 18 upon upon which is mounted a valve assembly 22. Such assemblies commonly include associated fittings, pressure gages, release valves and the like.

The bottom portion 20 of the tank is usually flat so that the tank may rest upright. Such tanks are constructed of steel or heavy aluminum and are designed to contain compressed gases such as air, nitrogen, propane, acetylene, oxygen and the like at very high pressures. Because the cover of the present invention is open-ended, it can be used with tanks of varying length. Also, the cover includes a diameter adjustment system to allow its use with tanks of varying diameters.

The cover includes head portion 12 from which extends sleeve portion 14. The head portion is preferably rounded or parabolic in shape and encloses the valve assembly 22. It may comprise a solid plastic material with a cut-out area 38 for enclosing a variety of sizes and shapes of valves and associated devices. Alternatively, the head portion may comprise a sleeve containing cushioning material or comprise a reinforcing gridwork with an open area for the valve assembly.

Figure 3:
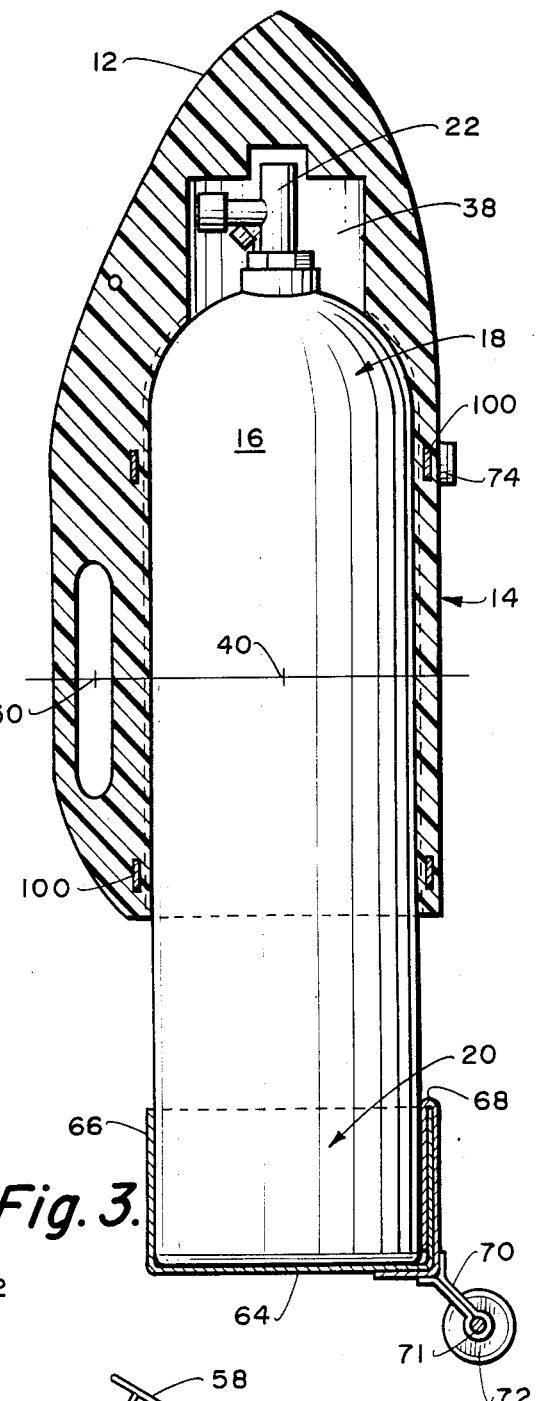
FIG. 3 is a cross-sectional view taken along lines 3—3 of FIG. 1.

The sleeve 14 extends over at least the upper portion 18 of the tank and preferably beyond the longitudinal center of gravity point of a typical tank that is encircled thereby. In FIG. 3, such point is shown by reference numeral 40. The sleeve includes a lower portion 24 and terminates at bottom edge 26.

The interior surface of the sleeve is provided with ribs 42 which define vent channels 44. Such ribs extend longitudinally at least from the cut-out area 38 of the interior head portion longitudinally to the bottom edge 26 thereof. In this manner, any gases or liquid accumulation in the cut-out area may be readily vented to the atmosphere. Additionally, the ribs and vent channels facilitate engagement to, and removal from, the tank 16.

Various types of handle means may be utilized for lifting, carrying or pulling the overall assembly. As shown, the primary means comprises projection 46 which is an elongated flange integral with the sleeve. It extends outwardly from the sleeve with its longitudinal axis parallel to the longitudinal axis of the sleeve.

The flange may be shaped to allow the manual grasping thereof or it may be provided with a hand-sized handle opening 48 extending therethrough. Preferably, the center axis 50 of the handle opening will be coextensive and in the same radial plane as the predetermined center of gravity point 40 of tank 16. In this manner, the overall assembly will be balanced for ease of carrying.

Figure 2:
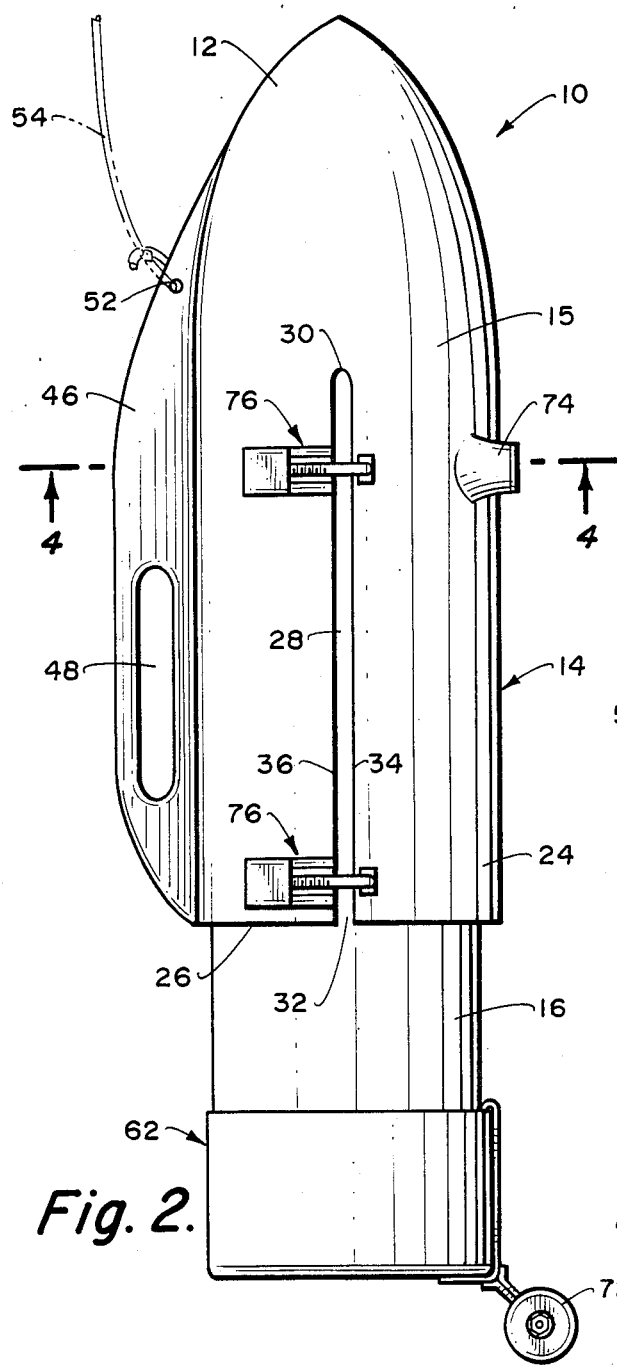
FIG. 2 is a side elevational view of the cover and transport assembly shown in FIG. 1.
Figure 9:
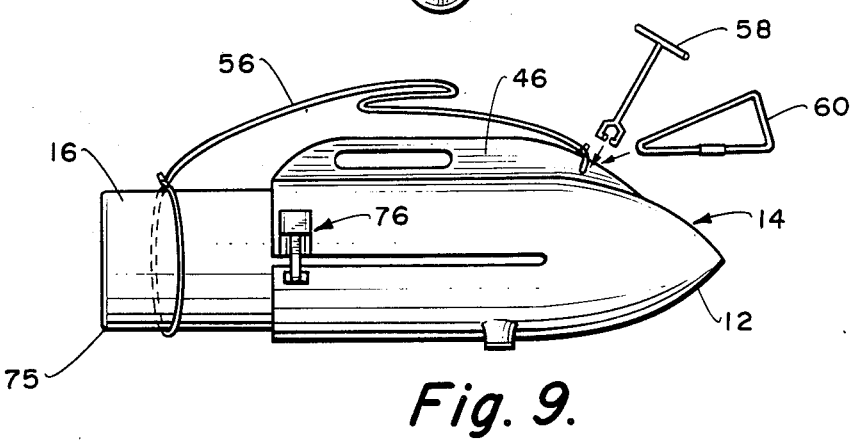
FIG. 9 is a side elevational view of the cover and transport assembly of the invention illustrating alternative handling devices.

The projection may also include a connector means shown by orifice 52. As shown in FIGS. 2 and 9, the orifice provides a simple means for attachment of handle means such as a rope, cable or chain 54; loopstrap 56; T-bar 58 or triangular bar 60. Of course, other handle means known in the art may also be attached to provide for the lifting, carrying and transporting of the overall cover and tank assembly.

To further facilitate transport of the tank, an optional boot, shown generally by reference 62, may be provided. The boot conforms to the shape of bottom portion 20 of the tank. It comprises a flat circular bottom wall 64 from which extends annular wall 66. The boot diameter is sized to closely approximate the tank diameter so that a close frictional engagement may occur with the tank bottom portion.

Figure 10:
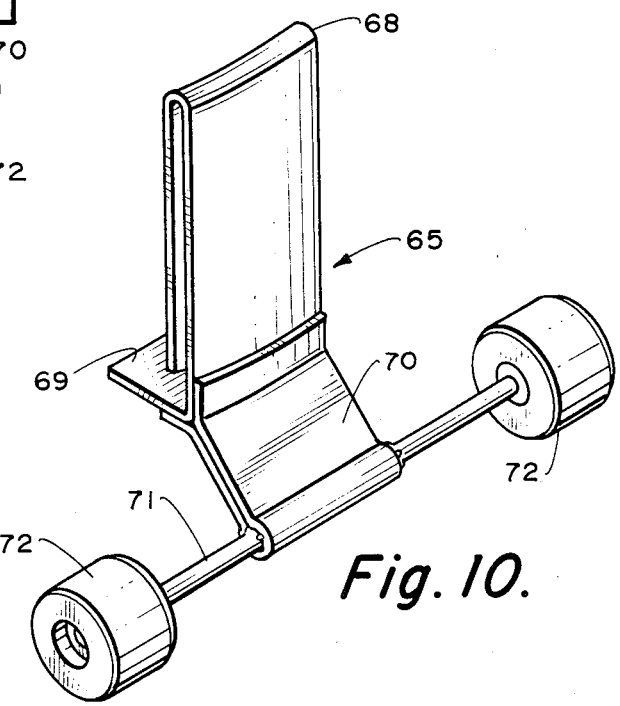
FIG. 10 is a side view of a wheel assembly for the present invention.
Figure 4:
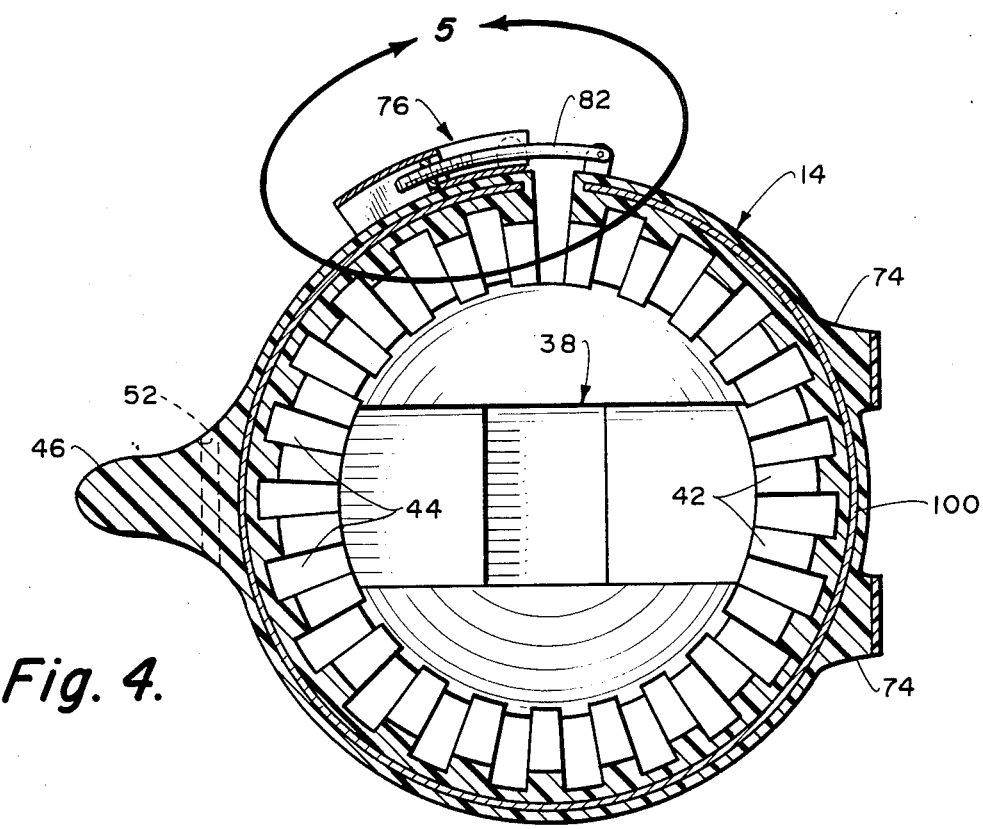
FIG. 4 is a cross-sectional view taken along lines 4—4 of FIG. 2.

A wheel assembly 65 may also be attached to the tank. For convenience, such may be used in combination with boot 62. As best shown in FIG. 10, the assembly comprises a clip structure 68 which is used for attachment to the boot. The clip is somewhat L-shaped in structure and has a leg 69. The clip is adapted to fit over boot sidewall 66 with leg 69 underlying and supporting the bottom wall 64. Extending angularly down from the lower corner of the clip is link member 70. The link member secures axle 71 to the clip which in turn is provided with wheels 72 at the opposing ends thereof. The wheels provide rolling ground surface support for the tank and cover and allow transport of the assembly by pulling. Also, the wheel assembly may be utilized in conjunction with any one of the above-described handle means to facilitate both pulling and lifting, when necessary, of the tank and cover assembly.

In the absence of the wheel assembly and because of the circular shape of the overall cover and tank, the sleeve is preferably provided with at least one pair of legs shown by reference numeral 74. The legs extend from the sleeve in a direction opposite to the radial axis of projection 46. Each leg is spaced-apart from the other on the circumference of the sleeve exterior. They are located in the upper region of the sleeve above the center of gravity point 40 of the combined assembly. In this manner, a stable three point ground contact is provided between each leg and the tank bottom edge 75. Optimally, a second pair of legs could extend in the same direction from the sleeve lower portion 24 and thereby provide a four-point support for the assembly. Such would be used in the absence of the aforementioned wheel assembly.

To allow for engagement with tanks of varying circumferences and to provide for the effective frictional engagement thereof, sleeve 14 is constructed of resilient material and is provided with an elongated slot 28. The slot extends from an open end 32 at bottom edge 26 longitudinally to a closed end 30. The closed end is located in the upper region 15 of the sleeve. The thickness of the sleeve defines a first side 34 of the slot and an opposing second side 36 thereof.

To provide for securement of the sleeve and the aforementioned engagement thereof to the tank walls, a locking means 76 is provided. The locking means comprises a mechanism for contracting the distance shown by W in FIG. 8 between sides 34, 36 of the slot.

In the embodiment shown, contraction is accomplished by use of a first pivot means shown by first hinge 78 and second pivot means shown by second hinge 80. The hinges are secured to the sleeve adjacent opposing sides of the slot 28 and are directly across from each other. Rod member 82 is pivotally attached to the first hinge by rod pin 83. The rod member extends across the slot and terminates at free end 84. The free end includes an adjustment means such as a fastener that can be releasably secured along the axis thereof. As shown, the fastener comprises nut 86 which is threadedly attached to the free end. Pins, clamps, resilient sleeves and washers could also be used.

Figure 6:
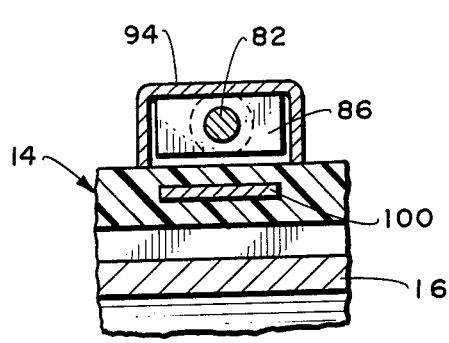
FIG. 6 is a fragmentary cross-sectional view taken along lines 6—6 of FIG. 5.
Figure 7:
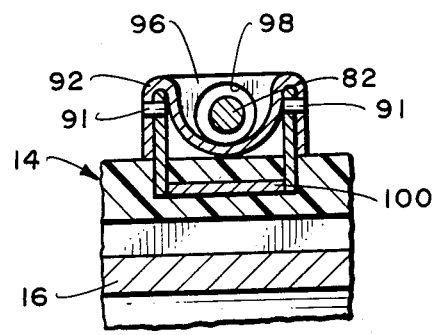
FIG. 7 is a fragmentary cross-sectional view taken along lines 7—7 of FIG. 5.

Attached to the second hinge 80 by pin 91 is draw member 90. This member also rotates in the plane as does the rod member. It comprises a receiver portion 92 adjacent its hinged end and a handle portion 94 adjacent its proximal end. The receiver portion is U-shaped as best viewed in FIG. 7 and the handle portion is an inverted U-shape as shown in FIG. 6. The respective portions are separated by abutment part 96. The abutment part is provided with an opening 98 through which the rod member 82 extends and freely moves therethrough.

Operation

Figure 5:
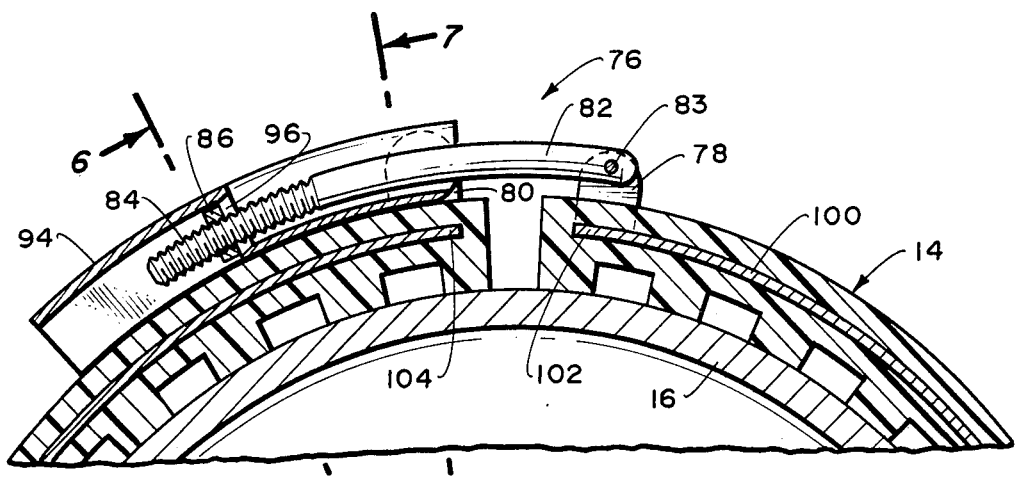
FIG. 5 is an enlarged fragmentary cross-sectional view taken along line 5 of FIG. 4.
Figure 8:
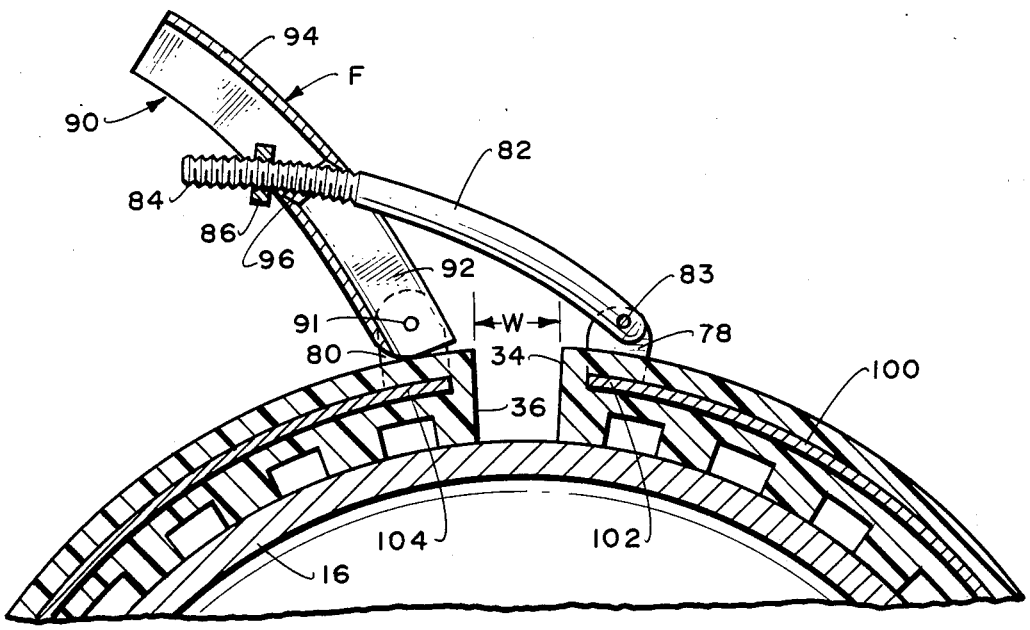
FIG. 8 is a cross-sectional view similar to FIG. 5 showing operation of the locking means.

With reference now to FIG. 8, when handle portion 94 is rotated downwardly in the direction shown by arrow F, the free end of the rod member will be pulled through opening 98 until nut 86 engages abutment part 96. Such engagement should occur before the draw member is completely down to its locked position as shown in FIG. 5.

Engagement of the nut with the abutment part will transmit additional rotational force F through the longitudinal extent of the rod member and draw first hinge 78 toward the second hinge 80. This will thereby pull the edge 34 toward side 36 thereby contracting the width W of the slot. This, in turn, will draw the ribs 42 against the exterior wall surface of the tank and create a frictional engagement therewith.

In reverse, lifting handle portion 94 will release tension created by the inherent resilience of the sleeve material. This will allow the slot to return to its orginal unstressed width shown in FIG. 8. It is expected that the width W of the slot will be wide enough to accomodate tanks of varying diameters while still allowing sufficient contaction for the aforementioned frictional engagement.

To help ensure an even distribution of contracting force about the circumference of the tank walls when the above-described locking mechanism is operated, a strap 100 having opposing end portions 102 and 104 may encircle the sleeve. When the sleeve is constructed of molded plastic, the strap may be embedded therein as shown. In either case, first end 102 shall terminate adjacent slot edge 34 and hinge 78 so that said hinge may be secured thereto. Likewise, second end 104 of the strap shall terminate adjacent edge 36 with second hinge 80 secured thereto. In this manner, as the locking mechanism is operated the force on the hinges will be distributed evenly about an annular circumferential area of the sleeve.

It will be appreciated that two locking mechanisms, as shown in FIG. 2, or more may be used as dictated by the strength of materials and sleeve construction used in the cover assembly. FIG. 9 shows a singular locking mechanism which should be located in the lower portion 24 of the sleeve. This will allow maximum leverage for contracting the slot width against the resiliency of the sleeve.

While the invention has been described with respect to preferred embodiments, it will be apparent to those skilled in the art that various modifications may be made without departing from the scope and spirit of the invention. As such, it will be understood that the invention is not to be limited by the aforementioned illustrative embodiments but only by the scope of the appended claims.

I claim:

1. A cover for a cylindrical portable compressed gas tank having a valve assembly at a top end thereof comprising:
    a head portion for enclosing the valve assembly from which extends an annular sleeve for encircling at least the upper portion of said tank;
    an elongated slot through said sleeve extending longitudinally from the bottom edge thereof;
    a locking means mounted upon said sleeve for securing the sleeve in frictional engagement with the upper portion of said tank to be contained therein comprising a contracting mechanism for reducing the distance between opposing sides of said slot including a first pivot means mounted on said sleeve proximate the lower portion thereof adjacent a side of said slot and a second pivot means mounted on said sleeve across said slot from said first pivot means, said sleeve including a concentric reinforcing band having a first end connected to said first pivot means and a second end connected to said second pivot means;
    a rotatable draw member attached to said first pivot means having an abutment part with an opening therethrough; and,
    a rotatable rod member attached to said second pivot means having a free end that extends across the slot and through said opening, said rod member including an adjustment means on said free end for engagement with the abutment part when said draw member and rod member are rotated to a lock position.

2. The cover of claim 1 wherein said draw member comprises a U-shaped receiver portion connected to said second pivot means and an inverted U-shaped handle portion comprising the proximal end thereof.

3. The cover of claim 2 wherein said receiver portion is separated from said handle portion by the abutment part.

4. The cover of claim 1 wherein said first and second pivot means are hinges.

5. The cover of claim 4 wherein said adjustment means comprises a fastener releasably securable along the longitudinal extent of said free end.

6. The cover of claim 5 wherein the free end of said rod member is threaded and said fastener comprises a nut.

7. The cover of claim 1 wherein said sleeve is constructed of plastic and the reinforcing band comprises resilient strap embedded therein.

8. The cover of claim 1 wherein said locking means comprises at least two contracting mechanisms.

9. The cover of claim 1 including a handle means comprising a projection extending outwardly from the exterior thereof.

10. The cover of claim 9 wherein said projection has a hand opening therethrough to facilitate manual grasping.

11. The cover of claim 10 wherein the sleeve extends from said head portion a distance proximate the predetermined longitudinal center of gravity of said tank to be contained therein.

12. The cover of claim 11 wherein the projection extends radially outward from said sleeve with said hand opening located radially outward from said center of gravity.

13. The cover of claim 9 wherein said projection includes connector means for attaching a member selected from the group consisting of strap, cable, rope, T-bar, triangle bar or chain to the sleeve.

14. The cover of claim 13 including a boot for engaging the bottom portion of said tank.

15. The cover of claim 14 wherein said boot comprises a flat bottom wall from which extends an annular sidewall that encircles and frictionally engages said tank bottom portion.

16. The cover of claim 15 wherein said boot includes a wheel assembly attached thereto for transporting said tank.

17. The cover of claim 16 wherein said wheel assembly comprises a clip structure for attachment to the boot sidewall, said structure being connected to an axle having a wheel at each end thereof for rolling support of said tank.

18. The cover of claim 9 wherein said sleeve includes a pair of legs extending from said sleeve on the side opposite from the projection.

19. The cover of claim 18 wherein said head portion is parabolic in exterior shape.

20. A cover for a cylindrical portable compressed gas tank having a valve assembly at a top end thereof comprising:
    a head portion for enclosing the valve assembly from which extends an annular sleeve for encircling at least the upper portion of said tank;
    an elongated slot through said sleeve extending longitudinally from the bottom edge thereof;
    a locking means mounted upon said sleeve for securing the sleeve in frictional engagement with the upper portion of said tank to be contained therein comprising a contracting mechanism for reducing the distance between opposing sides of said slot;
    a handle means comprising a projection extending outwardly from the cover exterior including connector means for attaching a member selected from the group consisting of strap, cable, rope, T-bar, triangle bar or chain to the sleeve;
    a boot for engaging the bottom portion of said tank having a flat bottom wall from which extends an annular sidewall that encircles and frictionally engages said tank bottom portion; and,
    a wheel assembly attached to said boot for transporting the tank comprising a clip structure for attachment to the boot sidewall, said structure being connected to an axle having a wheel at each end thereof for rolling support of said tank.

21. A cover for a cylindrical portable compressed gas tank having a valve assembly at a top end thereof comprising:
    a head portion constructed of plastic material having an interior open area for enclosing the valve assembly from which extends an annular sleeve for encircling at least the upper portion of said tank with at least a portion of the interior surface of said sleeve including ribs extending longitudinally from said open area to the sleeve bottom edge;
    an elongated slot through said sleeve extending longitudinally from the bottom edge thereof; and,
    a locking means mounted upon said sleeve for securing the sleeve in frictional engagement with the upper portion of said tank to be contained therein.

* * * * *